United States Patent
Thomas

(10) Patent No.: US 12,403,837 B2
(45) Date of Patent: Sep. 2, 2025

(54) GLOVE BOX FOR A VEHICLE

(71) Applicant: Ford Global Technologies, LLC, Dearborn, MI (US)

(72) Inventor: Gregory Paul Thomas, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 428 days.

(21) Appl. No.: 18/045,653

(22) Filed: Oct. 11, 2022

(65) Prior Publication Data

US 2024/0116449 A1 Apr. 11, 2024

(51) Int. Cl.
*B60R 7/06* (2006.01)

(52) U.S. Cl.
CPC ...................................... *B60R 7/06* (2013.01)

(58) Field of Classification Search
CPC .... B60R 7/04; B60R 7/06; B60R 7/08; B60R 2011/0005
USPC .............................................. 296/37.8, 37.12
See application file for complete search history.

(56) References Cited

U.S. PATENT DOCUMENTS

| | | | |
|---|---|---|---|
| 5,915,776 A | 6/1999 | Bieri | |
| 6,109,493 A | 8/2000 | Bieri | |
| 6,854,779 B2 * | 2/2005 | Gehring | B60N 3/102 224/483 |
| 8,398,139 B2 * | 3/2013 | Blackmore | B60R 7/06 312/274 |
| 8,556,320 B2 * | 10/2013 | Yamagishi | B60R 7/04 296/37.8 |
| 10,449,907 B2 * | 10/2019 | Dunham | B60Q 3/225 |
| 10,533,351 B2 * | 1/2020 | Yano | B60R 7/04 |
| 2006/0197353 A1 | 9/2006 | Hanzel et al. | |
| 2011/0220705 A1 | 9/2011 | Acevedo et al. | |
| 2020/0130593 A1 | 4/2020 | Sukumar | |

FOREIGN PATENT DOCUMENTS

DE 3510405 A1 * 2/1985
DE 19906052 A1 8/2000

* cited by examiner

*Primary Examiner* — Jason S Daniels

(74) *Attorney, Agent, or Firm* — Vichit Chea; Price Heneveld LLP

(57) ABSTRACT

A glove box for a vehicle includes a bin having an upper rim and defining a storage cavity accessible via an opening defined by the upper rim. The glove box further includes a retainer pivotably coupled to the bin and operable to pivot relative to the bin between a first position and a second position. In the first position, a portion of the retainer is positioned within the storage cavity. In the second position, the retainer is positioned wholly outside of the storage cavity.

18 Claims, 7 Drawing Sheets

GLOVE BOX FOR A VEHICLE

FIELD OF THE DISCLOSURE

The present disclosure generally relates to a glove box for a vehicle. More specifically, the present disclosure relates to a glove box for a vehicle that includes a retainer pivotably coupled to a bin of the glove box.

BACKGROUND OF THE DISCLOSURE

Vehicles often include glove boxes and other storage compartments.

SUMMARY OF THE DISCLOSURE

According to a first aspect of the present disclosure, a glove box for a vehicle includes a bin having an upper rim and defining a storage cavity accessible via an opening defined by the upper rim. The glove box further includes a retainer pivotably coupled to the bin and operable to pivot relative to the bin between a first position and a second position. In the first position, a portion of the retainer is positioned within the storage cavity. In the second position, the retainer is positioned wholly outside of the storage cavity.

Embodiments of the first aspect of the disclosure can include any one or a combination of the following features:
- the retainer includes a cradle that defines a receiving space, wherein, in the first position of the retainer, the cradle is positioned within the storage cavity and oriented such that a base of the cradle extends beneath the receiving space;
- in the second position of the retainer, the cradle is oriented such that a side wall of the cradle that extends outward from the base extends beneath the receiving space;
- the bin includes at least one retention feature, and the retainer includes at least one engagement feature configured to elastically deform due to contact with the at least one retention feature as the retainer enters at least one of the first position and the second position, such that contact between the at least one engagement feature and the at least one retention feature yieldingly maintains the retainer in the at least one of the first position and the second position;
- the at least one retention feature includes a first retention feature that protrudes into the storage cavity, and the at least one engagement feature includes a first engagement feature that extends outward from the base of the cradle opposite the receiving space defined by the cradle, wherein contact between the first engagement feature and the first retention feature yieldingly maintains the retainer in the first position;
- the at least one retention feature further includes a second retention feature that is positioned outside of the storage cavity, and the at least one engagement feature further includes a second engagement feature that is positioned nearer than the first engagement feature to a hinge that pivotably couples the retainer with the bin, wherein contact between the second engagement feature and the second retention feature yieldingly maintains the retainer in the second position;
- the bin is operably coupled to a dashboard of the vehicle and is operable to translate relative to the dashboard of the vehicle between an open position and a closed position;
- the retainer is configured to pivot relative to the bin about a pivot axis, wherein the pivot axis is substantially parallel to the direction that the bin translates from the open position to the closed position; and
- the retainer is integrally coupled with the bin and operable to pivot relative to the bin via deformation of a living hinge that extends between the retainer and the bin.

According to second aspect of the present disclosure, a glove box for a vehicle includes a bin defining a storage cavity and being operable to translate in a first direction relative to a dashboard of the vehicle from an open position to a closed position. In the open position, the storage cavity is accessible. In the closed position, the storage cavity is covered by the dashboard. The glove box further includes a retainer pivotably coupled to the bin and operable to pivot relative to the bin between a first position and a second position about a pivot axis that is substantially parallel to the first direction.

Embodiments of the second aspect of the disclosure can include any one or a combination of the following features:
- the retainer is integrally coupled with the bin and operable to pivot relative to the bin via deformation of a living hinge that extends between the retainer and the bin;
- a portion of the retainer is positioned within the storage cavity in the first position, and the retainer is positioned wholly outside of the storage cavity in the second position;
- the retainer includes a cradle that defines a receiving space, wherein, in the first position of the retainer, the cradle is positioned within the storage cavity and oriented such that a base of the cradle extends beneath the receiving space; and
- in the second position of the retainer, the cradle is oriented such that a side wall of the cradle that extends outward from the base extends above the receiving space.

According to a third aspect of the present disclosure, a storage compartment includes a bin defining a storage cavity, and a retainer pivotably coupled to the bin and having a cradle. The retainer is pivotable relative to the bin from a first position to a second position. In the first position, the cradle is positioned within the storage cavity. In the second position, the cradle is positioned outside of the storage cavity.

Embodiments of the third aspect of the disclosure can include any one or a combination of the following features:
- the bin is operably coupled to a dashboard of a vehicle and operable to move relative to the dashboard of the vehicle between an open position and a closed position;
- the bin is operable to translate relative to the dashboard of the vehicle between the open and closed positions;
- the retainer pivots relative to the bin about a pivot axis that is substantially parallel to the direction that the bin translates from the open position to the closed position;
- the retainer is integrally coupled with the bin and operable to pivot relative to the bin via deformation of a living hinge that extends between the retainer and the bin; and
- in the first position of the retainer, the cradle is positioned within the storage cavity and oriented such that a base of the cradle extends beneath a receiving space defined by the cradle.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
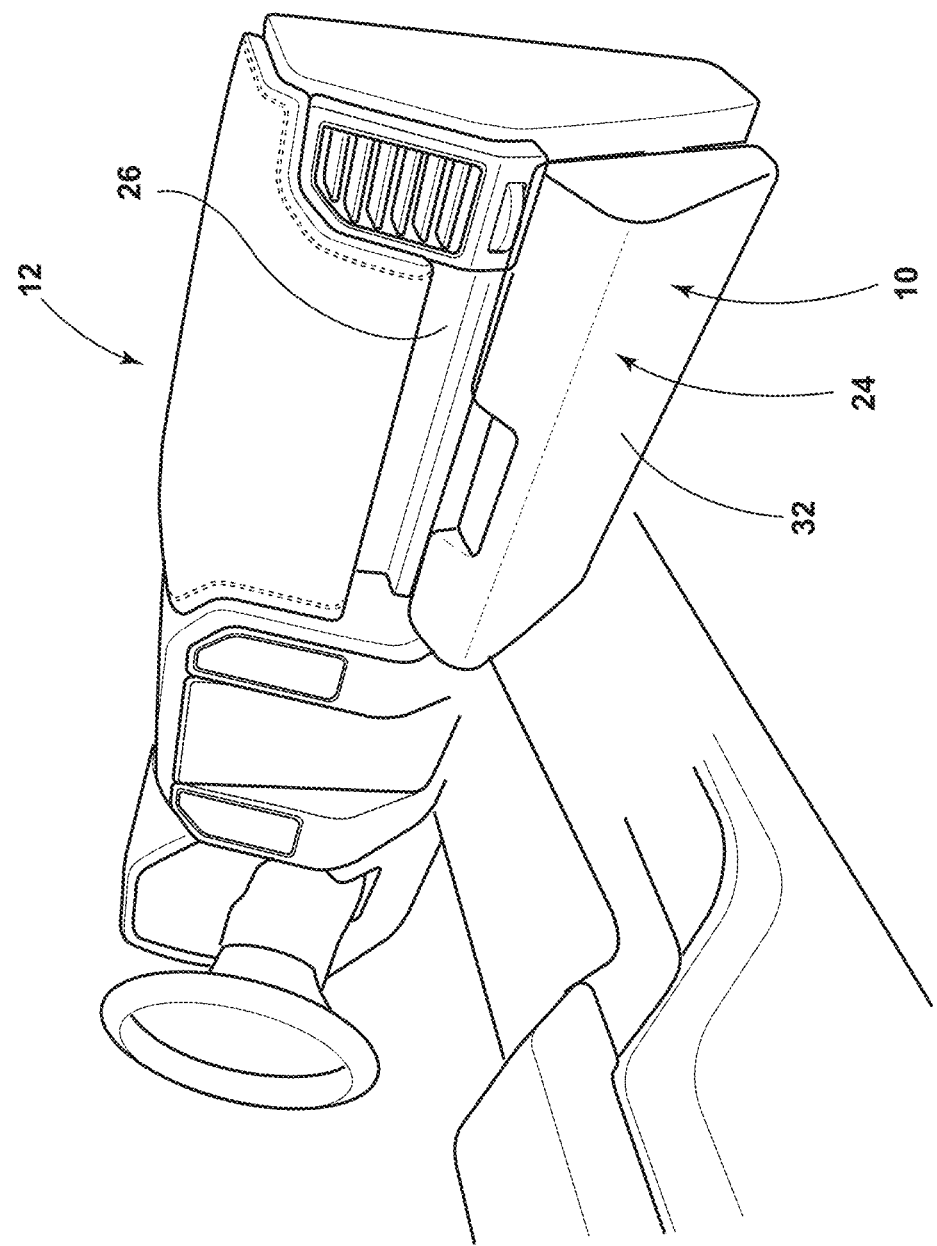
FIG. 1 is a side perspective view of a glove box of a vehicle in a closed position, wherein a storage cavity of the glove box is covered by a dashboard of the vehicle, according to at least one embodiment.

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-7, a glove box 10 for a vehicle 12 includes a bin 14. The bin 14 has an upper rim 16 and defines a storage cavity 18 that is accessible via an opening 20 defined by the upper rim 16. A retainer 22 is pivotably coupled to the bin 14 and is operable to pivot relative to the bin 14 between a first position and a second position. In the first position, a portion of the retainer 22 is positioned within the storage cavity 18. In the second position, the retainer 22 is positioned wholly outside of the storage cavity 18.

Figure 2:
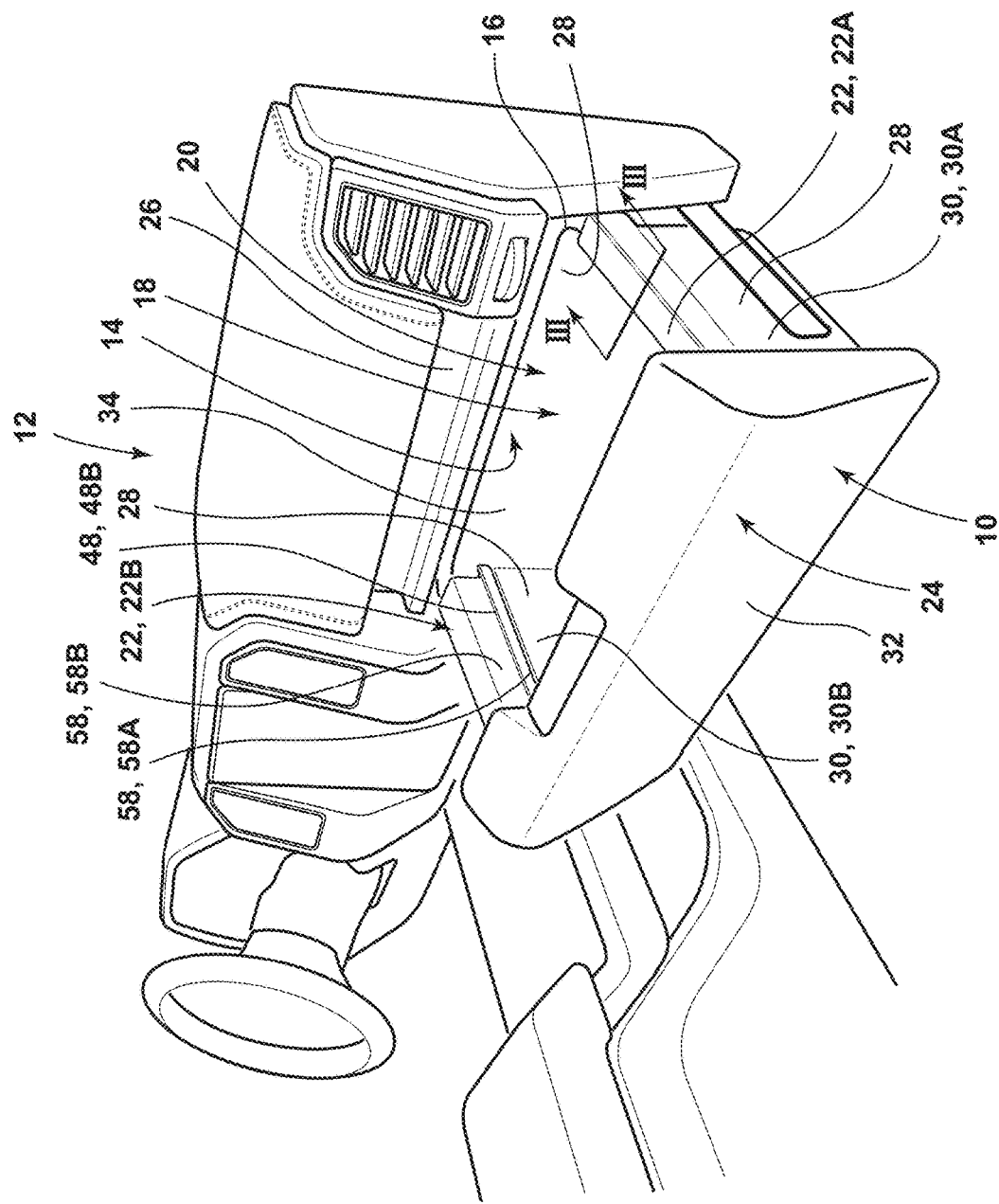
FIG. 2 is a side perspective view of the glove box, illustrating the glove box in an open position and a retainer coupled to a bin of the glove box in a first position, according to at least one embodiment.

Referring now to FIGS. 1 and 2, a storage compartment 24 is illustrated. In various embodiments, the storage compartment 24 can be a storage compartment 24 within the vehicle 12. For example, as illustrated in FIGS. 1 and 2, the storage compartment 24 is the glove box 10 of the vehicle 12. The glove box 10 is operably coupled to a dashboard 26 of the vehicle 12. It is contemplated that the storage compartment 24 of the vehicle 12 can be positioned at a variety of locations within the vehicle 12.

Figure 3:
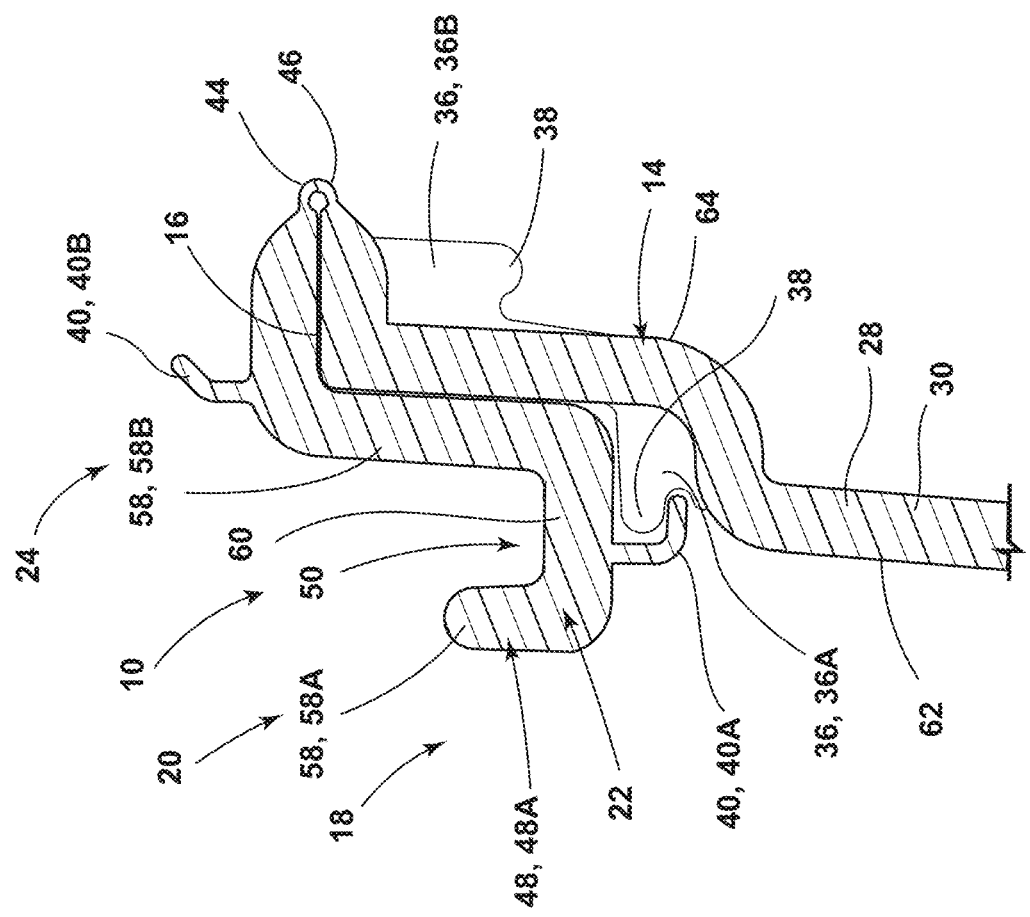
FIG. 3 is a cross-sectional view of the bin and the retainer of the glove box taken through line III-III of FIG. 2, illustrating the retainer in the first position, wherein a cradle of the retainer is positioned within the storage cavity defined by the bin, according to at least one embodiment.
Figure 4:
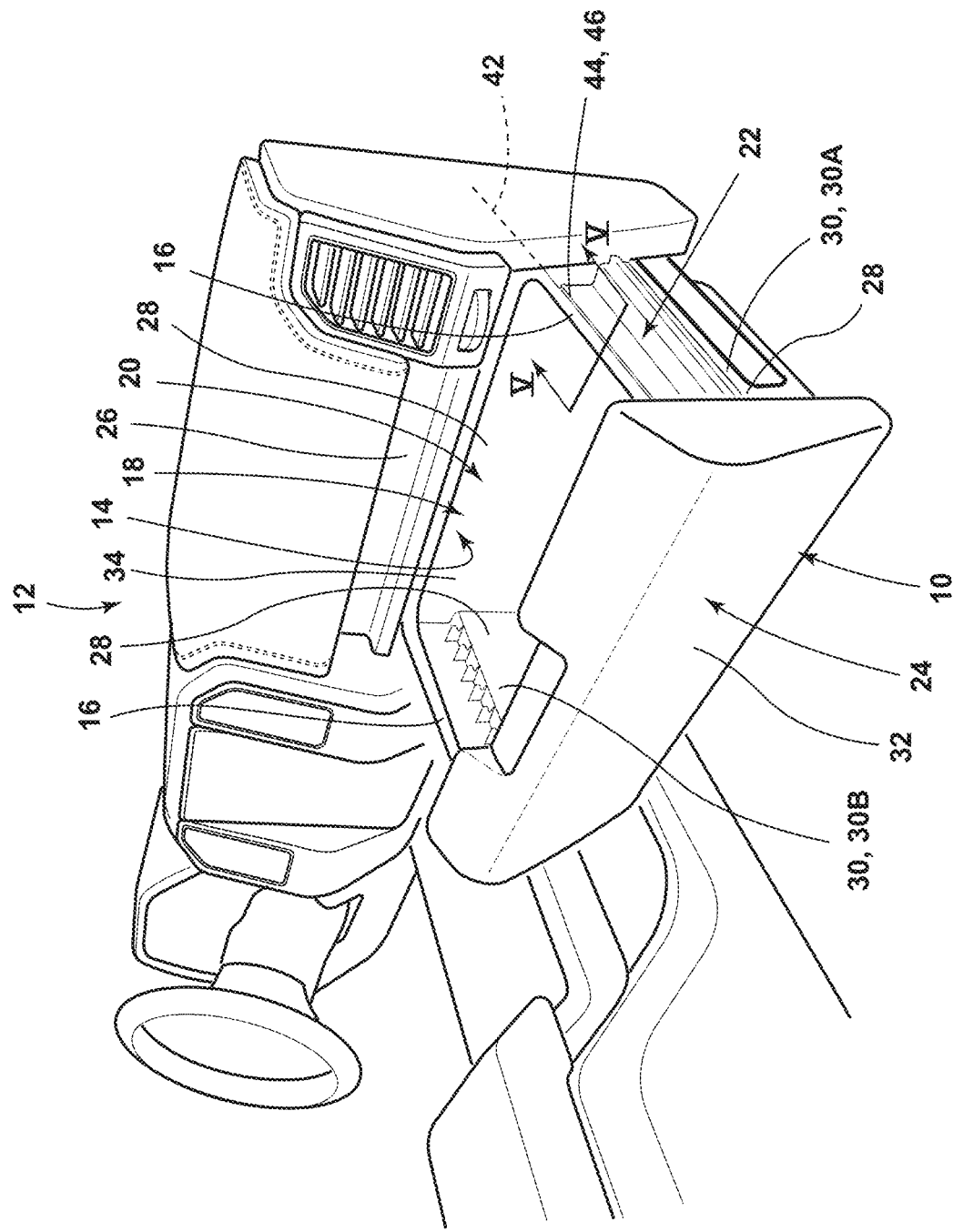
FIG. 4 is a side perspective view of the glove box, illustrating the retainer pivoted to a second position relative to the bin, according to at least one embodiment.

Referring now to FIGS. 1-4, the storage compartment 24 of the vehicle 12 can include the bin 14. As illustrated in FIG. 4, the bin 14 defines the storage cavity 18, and the storage cavity 18 is accessible via the opening 20 to the storage cavity 18. As illustrated in FIG. 4, the opening 20 to the storage cavity 18 can be defined by the upper rim 16 of the bin 14. The bin 14 can include a plurality of walls 28. In the embodiments illustrated in FIGS. 2 and 4, the bin 14 includes two side walls 30 that are opposite each other and extend vehicle-forward from a door panel 32 of the glove box 10 to a back wall 34 of the bin 14.

Referring now to FIGS. 1 and 2, the storage compartment 24 can be operable to move between the open position and the closed position. In the open position, the storage cavity 18 defined by the bin 14 of the storage compartment 24 is accessible. In the closed position, the storage cavity 18 is covered. In the embodiment illustrated in FIGS. 1 and 2, wherein the storage compartment 24 is the glove box 10 of the vehicle 12, the storage cavity 18 is accessible in the open position of the glove box 10, as illustrated in FIG. 2. In the closed position of the glove box 10 illustrated in FIG. 1, the storage cavity 18 defined by the bin 14 of the glove box 10 is covered by the dashboard 26 of the vehicle 12. In some embodiments, the storage compartment 24 is operable to translate between the open and closed positions. For example, as illustrated in FIGS. 1 and 2, the glove box 10 is operable to translate relative to the dashboard 26 of the vehicle 12 between the closed and open positions, as illustrated in FIGS. 1 and 2, respectively. It is contemplated that the storage compartment 24 may move between the open and closed positions in a variety of manners (e.g., translation, pivotal movement, etc.). In the embodiment illustrated in FIGS. 1 and 2, the glove box 10 is slidingly engaged with a portion of the dashboard 26 and is operable to translate vehicle-rearward from the closed position, as illustrated in FIG. 1, to the open position, as illustrated in FIG. 2.

Referring now to FIGS. 2-5, the bin 14 of the storage compartment 24 can include at least one retention feature 36. In some implementations, the at least one retention feature 36 protrudes into the storage cavity 18 defined by the bin 14. For example, the at least one retention feature 36 can be a protuberance 38 that extends outward from an interior surface 62 of the side wall 30 of the bin 14 into the storage cavity 18 defined by the bin 14. In some implementations, the at least one retention feature 36 can be positioned outside of the storage cavity 18 defined by the bin 14. For example, in some implementations, the at least one retention feature 36 can be a protuberance 38 that extends outward from an exterior surface 64 of the side wall 30 of the bin 14, generally away from the storage cavity 18 defined by the bin 14. In various embodiments, the at least one retention feature 36 can include a plurality of retention features 36. For example, in the embodiments illustrated in FIGS. 3 and 5, the at least one retention feature 36 includes a first retention feature 36A and a second retention feature 36B. In the illustrated embodiment, the first retention feature 36A protrudes into the storage cavity 18 from the interior surface 62 of the side wall 30 of the bin 14. Further, the second retention feature 36B is positioned outside of the storage cavity 18, wherein the second retention feature 36B is coupled to an exterior surface 64 of the bin 14 and protrudes outward therefrom. As described further herein, in various implementations, the at least one retention feature 36 may be configured to be engaged with an engagement feature 40 of the retainer 22 to yieldingly maintain the position of the retainer 22 relative to the bin 14. A variety of types of retention features 36 configured for engagement with corresponding engagement features 40 are contemplated.

Figure 5:
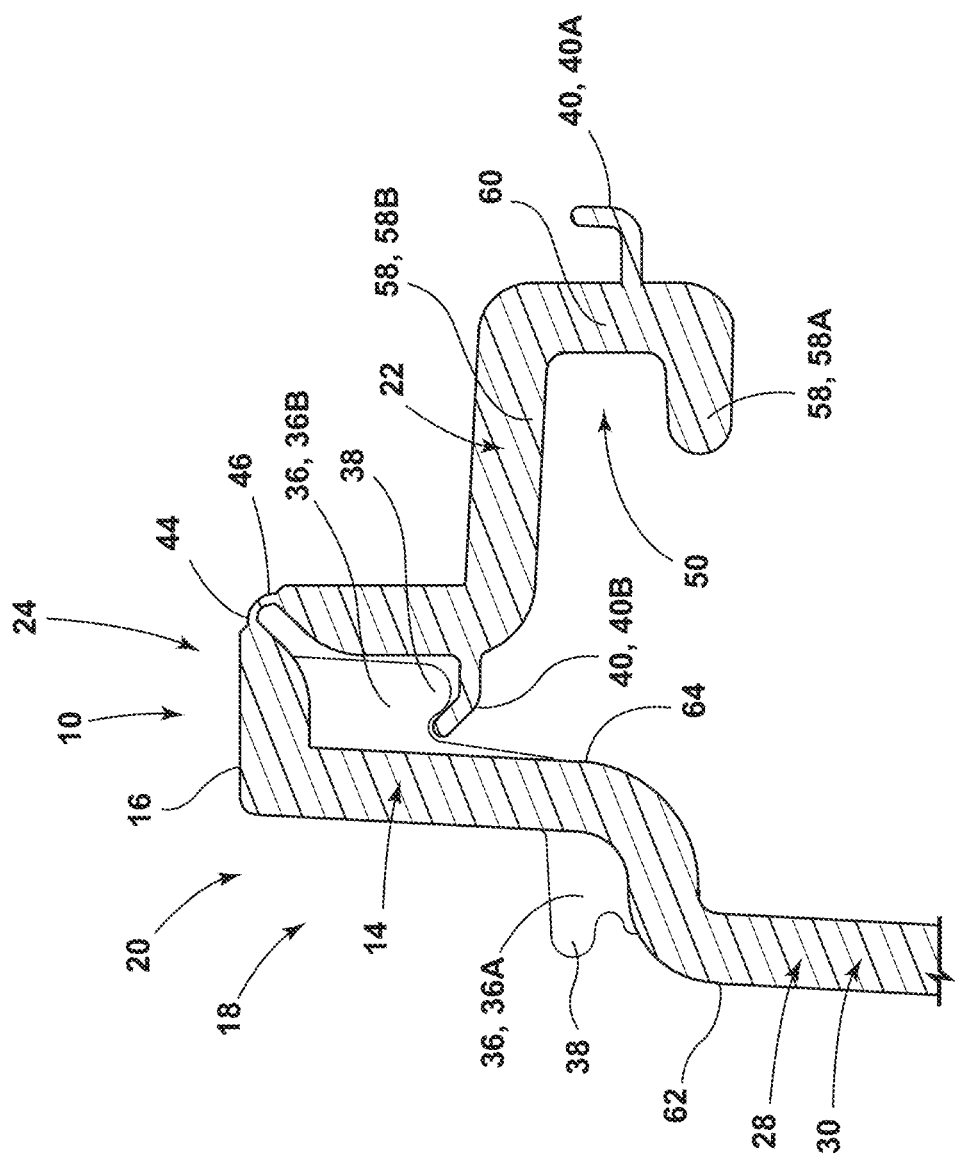
FIG. 5 is a cross-sectional view of the bin and the retainer of the glove box taken through line V-V of FIG. 4, illustrating the retainer in a second position, wherein the cradle of the retainer is positioned outside of the storage cavity defined by the bin, according to at least one embodiment.

Referring now to FIGS. 2-5, the retainer 22 can be pivotably coupled to the bin 14. In various embodiments, the retainer 22 is operable to pivot relative to the bin 14 between a first position and a second position. In the first position of the retainer 22, a portion of the retainer 22 is positioned within the storage cavity 18, as illustrated in FIG. 3. In the second position, a portion of the retainer 22 can be positioned outside of the storage cavity 18. In some implementations, in the second position of the retainer 22, the retainer 22 is positioned wholly outside of the storage cavity 18. For example, as illustrated in FIG. 5, wherein the retainer 22 is disposed in the second position, the retainer 22 is positioned wholly outside of the storage cavity 18 defined by the bin 14. In various embodiments, a portion of the retainer 22 passes through the opening 20 defined by the upper rim 16 of the storage cavity 18 as the retainer 22 pivots between the first and second positions. In various embodiments, the retainer 22 is configured to pivot relative to the bin 14 about a pivot axis 42, as illustrated in FIG. 4. In some implementations, wherein the bin 14 is configured to translate between the open and closed positions, the pivot axis 42 about which the retainer 22 pivots between the first and second positions is substantially parallel to the direction that the bin 14 translates from the open position to the closed position. In various embodiments, in the second position of the retainer 22, the bin 14 is operable to translate between the open and closed positions without interference between the retainer 22 and the dashboard 26 of the vehicle 12.

In various embodiments, the retainer 22 is pivotably coupled with the bin 14 via a hinge 44 coupled to the retainer 22. A variety of types of hinges 44 are contemplated. In some embodiments, the hinge 44 can be a living hinge 46. For example, as illustrated in FIGS. 3 and 5, the retainer 22 is integrally coupled with the bin 14 and is operable to pivot relative to the bin 14 via deformation of the living hinge 46 that extends between the retainer 22 and the bin 14. In the illustrated embodiment, the living hinge 46 is positioned proximate to the upper rim 16 of the bin 14, outside of the storage cavity 18 defined by the bin 14.

Referring now to FIGS. 2-5, the retainer 22 can include a cradle 48. The cradle 48 defines a receiving space 50. As described further herein, in operation of the storage compartment 24, the receiving space 50 defined by the cradle 48 of the retainer 22 may be configured to receive a corresponding attachment feature 52, such as a hook 54 of a divider 56 that extends within the storage cavity 18 defined by the bin 14 for organizational purposes. In the embodiment illustrated in FIG. 3, the cradle 48 includes side walls 58 and a base 60 that extends between the side walls 58. As illustrated in FIG. 3, the first side wall 58A of the cradle 48 is positioned distally from the hinge 44 that couples the retainer 22 with the bin 14. The base 60 extends outward from the first side wall 58A of the cradle 48 and is positioned between the hinge 44 and the first side wall 58A. The second side wall 58B extends outward from the base 60 and is positioned between the base 60 and the hinge 44. As illustrated in FIG. 3, the first side wall 58A, the base 60, and the second side wall 58B of the cradle 48 define the receiving space 50.

Referring still to FIGS. 2-5, in the first position of the retainer 22, as illustrated in FIGS. 2 and 3, the cradle 48 of the retainer 22 is positioned within the storage cavity 18. As illustrated in FIG. 3, in the first position of the retainer 22, the cradle 48 is oriented such that the base 60 of the cradle 48 extends beneath the receiving space 50. In other words, the base 60 of the cradle 48 is positioned vehicle-downward of the receiving space 50 in the first position of the retainer 22. As illustrated in FIGS. 4 and 5, in the second position of the retainer 22, the cradle 48 of the retainer 22 is positioned outside of the storage cavity 18 defined by the bin 14. Further, as illustrated in FIG. 5, the cradle 48 is oriented such that at least one side wall 58 of the cradle 48 extends outward from the base 60 of the cradle 48 beneath the receiving space 50. In the embodiment illustrated in FIG. 5, the first side wall 58A of the cradle 48 extends beneath the receiving space 50 defined by the cradle 48 in the second position of the retainer 22.

Referring now to FIGS. 3 and 5, the retainer 22 includes the at least one engagement feature 40 that is configured to be engaged with the at least one retention feature 36 of the bin 14. In various embodiments, the at least one engagement feature 40 of the retainer 22 is configured to elastically deform due to contact with the at least one retention feature 36 of the bin 14 as the retainer 22 enters at least one of the first position and the second position. The contact between the at least one engagement feature 40 and the at least one retention feature 36 may yieldingly maintain the retainer 22 in the at least one of the first position and the second position of the retainer 22. In various embodiments, the at least one engagement feature 40 can include a plurality of engagement features 40. For example, as illustrated in FIGS. 3 and 5, the at least one engagement feature 40 includes a first engagement feature 40A and a second engagement feature 40B. As illustrated in FIGS. 3 and 5, the first engagement feature 40A extends outward from the base 60 of the cradle 48 opposite the receiving space 50 defined by the cradle 48. In the illustrated embodiment, the first engagement feature 40A is generally L-shaped and configured to contact and/or be deformed by the first retention feature 36A of the bin 14 in the first position of the retainer 22, as illustrated in FIG. 3. In operation, contact between the first engagement feature 40A and the first retention feature 36A in the first position of the retainer 22 yieldingly maintains the retainer 22 in the first position, as illustrated in FIG. 3. The second engagement feature 40B is coupled to the retainer 22 between the base 60 of the retainer 22 and the hinge 44 that pivotably couples the retainer 22 and the bin 14. As illustrated in FIG. 5, the second engagement feature 40B is positioned nearer than the first engagement feature 40A to the hinge 44 that pivotally couples the retainer 22 with the bin 14. Contact between the second engagement feature 40B and the second retention feature 36B in the second position of the retainer 22 yieldingly maintains the retainer 22 in the second position, as illustrated in FIG. 5.

Figure 6:
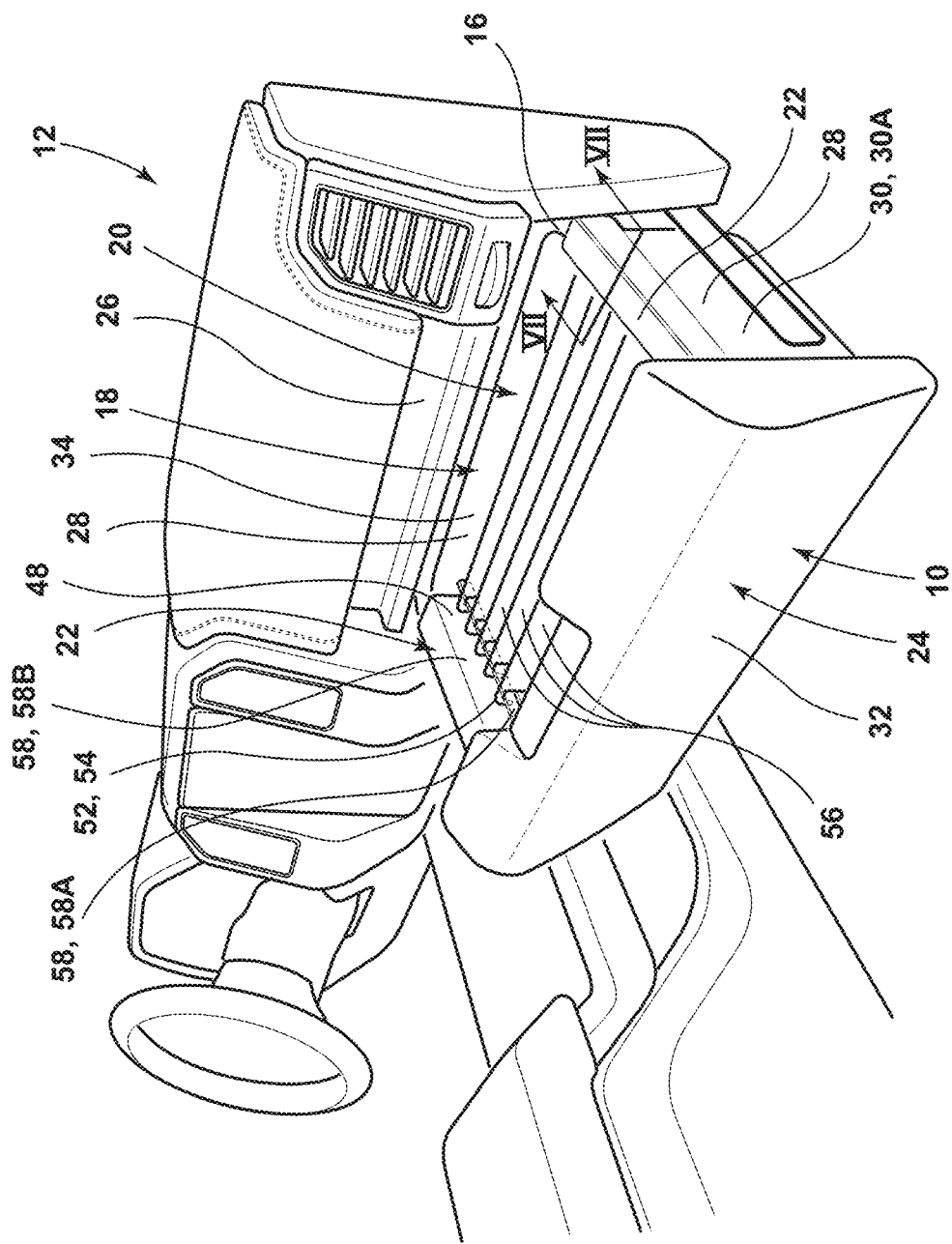
FIG. 6 is a side perspective view of the glove box in the open position, illustrating retainers coupled to the bin of the glove box in first positions, respectively, and a plurality of file cabinet dividers engaged with the retainers within the storage cavity defined by the bin of the glove box, according to at least one embodiment.
Figure 7:
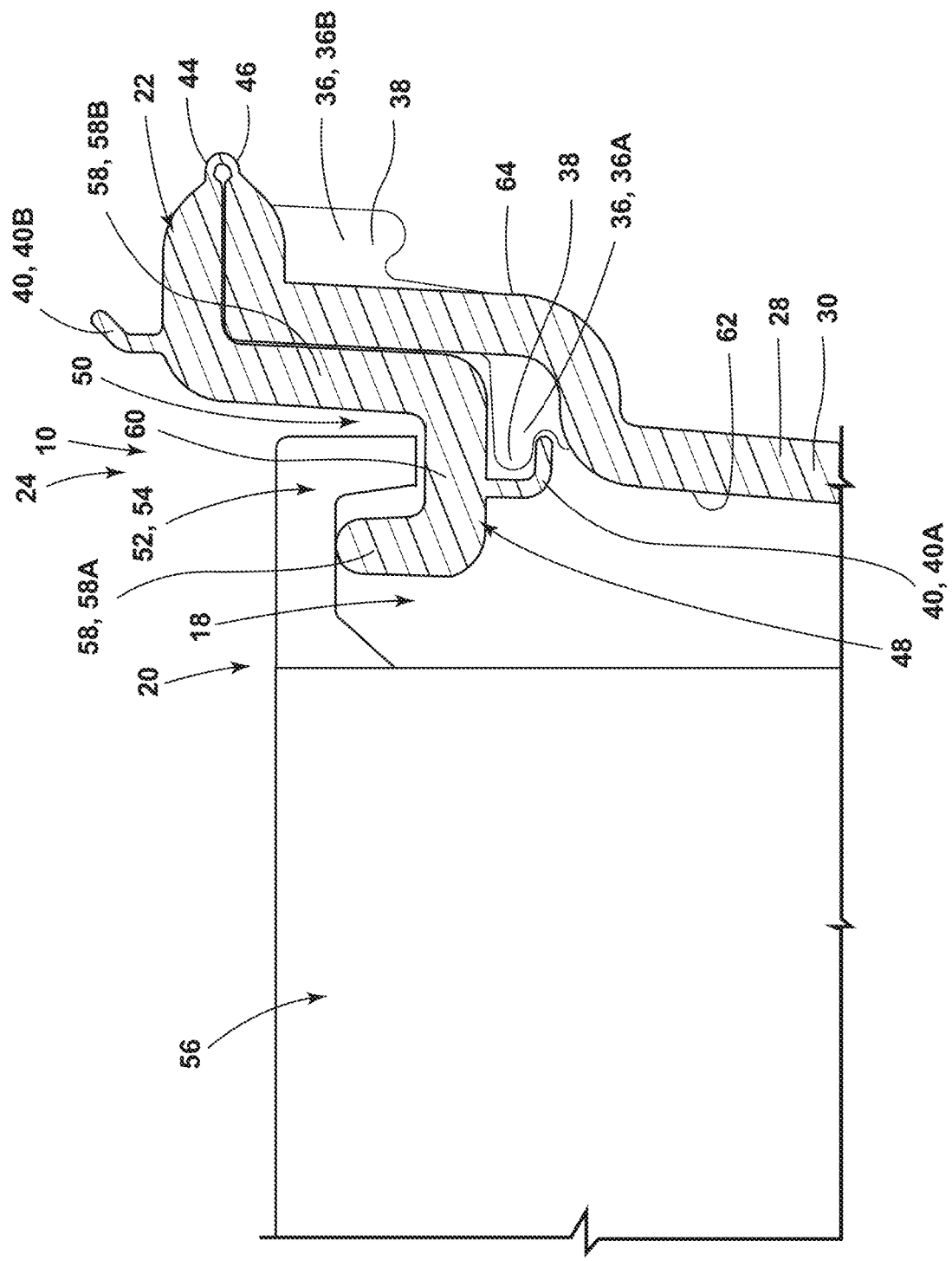
FIG. 7 is a cross-sectional view of the bin and the retainer of the glove box taken through line VII-VII of FIG. 6, illustrating the retainer in the first position and the divider engaged with the cradle of the retainer, according to at least one embodiment.

Referring now to FIGS. 2, 6, and 7, in various embodiments, the storage compartment 24 can include a plurality of retainers 22 coupled to the bin 14. For example, as illustrated in FIG. 2, the glove box 10 includes a first retainer 22A that is coupled with the first side wall 30A of the bin 14 and a second retainer 22B that is coupled with the second side wall 30B of the bin 14 opposite the first side wall 30A. In operation, the first and second retainers 22A, 22B can cooperate to selectively provide first and second cradles 48A, 48B, the receiving spaces 50 of which receive attachment features 52 of dividers 56 therein, as illustrated in FIGS. 6 and 7. As illustrated in FIG. 7, the receiving space 50 receives the attachment features 52 (e.g., hooks 54) of the dividers 56 disposed within the storage cavity 18 of the bin 14, such that the dividers 56 can be supported by, and movable along the cradle 48 of the retainer 22. The dividers 56 disposed within the storage cavity 18 may advantageously allow for organization of documents and/or other items within the storage cavity 18 of the storage compartment 24. Further, as illustrated in FIGS. 4 and 5, the plurality of retainers 22 may be pivoted to the respective second positions of the retainers 22 to provide additional space within the storage cavity 18 for storing items when dividers 56 are not desired.

The storage compartment 24 of the present disclosure may provide a variety of advantages. First, the retainer 22 being operable to receive an attachment feature 52 of a divider 56 while in the first position may conveniently allow for insertion of dividers 56 into the storage cavity 18 for organizational purposes. Second, the retainer 22 being pivotably coupled to the bin 14 and operable to pivot from the first position to the second position, wherein the retainer 22 is positioned wholly outside of the storage cavity 18, may conveniently allow the user to maximize the space available within the storage cavity 18 for storage of larger objects. Third, various portions of the storage compartment 24, such as the bin 14, the retainer 22, the at least one retention feature 36, and/or the at least one engagement feature 40, being integrally coupled with each other may reduce the complexity of assembly and the number of parts necessary, which can reduce the cost of the storage compartment 24.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A glove box for a vehicle, comprising:
   a bin having an upper rim and defining a storage cavity accessible via an opening defined by the upper rim; and
   a retainer integrally coupled with the bin and operable to pivot relative to the bin via deformation of a living hinge that extends between the retainer and the bin between a first position, wherein a portion of the retainer is positioned within the storage cavity, and a second position, wherein the retainer is positioned wholly outside of the storage cavity.

2. The glove box of claim 1, wherein the retainer includes a cradle that defines a receiving space, wherein, in the first position of the retainer, the cradle is positioned within the storage cavity and oriented such that a base of the cradle extends beneath the receiving space.

3. The glove box of claim 2, wherein, in the second position of the retainer, the cradle is oriented such that a side wall of the cradle that extends outward from the base and beneath the receiving space.

4. The glove box of claim 3, wherein the bin includes at least one retention feature, and the retainer includes at least one engagement feature configured to elastically deform due to contact with the at least one retention feature as the retainer enters at least one of the first position and the second position, such that contact between the at least one engagement feature and the at least one retention feature yieldingly maintains the retainer in the at least one of the first position and the second position.

5. The glove box of claim 4, wherein the at least one retention feature includes a first retention feature that protrudes into the storage cavity, and the at least one engagement feature includes a first engagement feature that extends outward from the base of the cradle opposite the receiving space defined by the cradle, wherein contact between the first engagement feature and the first retention feature yieldingly maintains the retainer in the first position.

6. The glove box of claim 5, wherein the at least one retention feature further includes a second retention feature that is positioned outside of the storage cavity, and the at least one engagement feature further includes a second engagement feature that is positioned nearer than the first engagement feature to a hinge that pivotably couples the retainer with the bin, wherein contact between the second engagement feature and the second retention feature yieldingly maintains the retainer in the second position.

7. The glove box of claim 1, wherein the bin is operably coupled to a dashboard of the vehicle and is operable to translate relative to the dashboard of the vehicle between an open position and a closed position.

8. The glove box of claim 7, wherein the retainer is configured to pivot relative to the bin about a pivot axis, wherein the pivot axis is substantially parallel to the direction that the bin translates from the open position to the closed position.

9. A glove box for a vehicle, comprising:
   a bin defining a storage cavity and being operable to translate in a first direction relative to a dashboard of the vehicle from an open position, wherein the storage cavity is accessible, to a closed position, wherein the storage cavity is covered by the dashboard; and
   a retainer pivotably coupled to the bin and operable to pivot relative to the bin between a first position and a second position about a pivot axis that is substantially parallel to the first direction.

10. The glove box of claim 9, wherein the retainer is integrally coupled with the bin and operable to pivot relative to the bin via deformation of a living hinge that extends between the retainer and the bin.

11. The glove box of claim 9, wherein a portion of the retainer is positioned within the storage cavity in the first position, and the retainer is positioned wholly outside of the storage cavity in the second position.

12. The glove box of claim 9, wherein the retainer includes a cradle that defines a receiving space, wherein, in the first position of the retainer, the cradle is positioned within the storage cavity and oriented such that a base of the cradle extends beneath the receiving space.

13. The glove box of claim 12, wherein, in the second position of the retainer, the cradle is oriented such that a side wall of the cradle that extends outward from the base extends above the receiving space.

14. A storage compartment, comprising:
a bin defining a storage cavity; and
a retainer integrally coupled with the bin and having a cradle, the retainer being operable to pivot relative to the bin via deformation of a living hinge that extends between the retainer and the bin from a first position, wherein the cradle is positioned within the storage cavity, to a second position, wherein the cradle is positioned outside of the storage cavity.

15. The storage compartment of claim 14, wherein the bin is operably coupled to a dashboard of a vehicle and operable to move relative to the dashboard of the vehicle between an open position and a closed position.

16. The storage compartment of claim 15, wherein the bin is operable to translate relative to the dashboard of the vehicle between the open and closed positions.

17. The storage compartment of claim 16, wherein the retainer pivots relative to the bin about a pivot axis that is substantially parallel to the direction that the bin translates from the open position to the closed position.

18. The storage compartment of claim 14, wherein, in the first position of the retainer, the cradle is positioned within the storage cavity and oriented such that a base of the cradle extends beneath a receiving space defined by the cradle.

* * * * *